United States Patent
Sebő

(10) Patent No.: US 10,757,919 B2
(45) Date of Patent: Sep. 1, 2020

(54) RELEASABLE CHEST PAD

(71) Applicants: JULIUS-K9 LLC, Tampa, FL (US); JULIUS-K9 Zrt., Szigetszentmiklós (HU)

(72) Inventor: Gyula Sebő, Szigetszentmiklós (HU)

(73) Assignees: JULIUS-K9 LLC, Tampa, FL (US); JULIUS-K9 ZRT., Szigetszentmiklos (HU)

( * ) Notice: Subject to any disclaimer, the term of this patent is extended or adjusted under 35 U.S.C. 154(b) by 286 days.

(21) Appl. No.: 16/004,386

(22) Filed: Jun. 9, 2018

(65) Prior Publication Data
US 2019/0075759 A1   Mar. 14, 2019

(30) Foreign Application Priority Data

Sep. 14, 2017 (HU) .................................. 1700385

(51) Int. Cl.
*A01K 27/00*   (2006.01)
(52) U.S. Cl.
CPC .......... *A01K 27/002* (2013.01); *A01K 27/003* (2013.01)
(58) Field of Classification Search
CPC .. A01K 27/002; A01K 1/0263; A01K 13/006; A01K 27/003; A01K 27/005; A01K 27/008
USPC ....... 119/863, 792, 907, 856, 864, 850, 858, 119/865
See application file for complete search history.

(56) References Cited

U.S. PATENT DOCUMENTS

| | | | | |
|---|---|---|---|---|
| 4,559,906 A | * | 12/1985 | Smith ................. | A01K 1/0263 |
| | | | | 119/728 |
| 4,676,198 A | * | 6/1987 | Murray ............... | A01K 1/0263 |
| | | | | 119/771 |
| D313,677 S | * | 1/1991 | Hammon .................. | D30/152 |

(Continued)

FOREIGN PATENT DOCUMENTS

| | | |
|---|---|---|
| DE | G 90 17 247.7 U1 | 3/1991 |
| DE | 202 19 554 U1 | 3/2003 |

(Continued)

OTHER PUBLICATIONS

English language machine-translation of Abstract of DE 20 2010 016 578 U1 (Jul. 14, 2011).

(Continued)

*Primary Examiner* — Yvonne R Abbot-Lewis
(74) *Attorney, Agent, or Firm* — Hershkovitz & Associates, PLLC; Abe Hershkovitz

(57) ABSTRACT

A releasable chest pad including a padding portion designed to form a single structural unit with an outer chest strap part and threaded through chest strap parts on the two sides thereof that fit into loop adjuster frames of the dog chest harness. A lining padding portion coming into contact with the body of the dog, is fixed only to the outer chest strap part by a bearing portion fixing zone for the adjustability of the threaded through chest strap parts. The lining padding portion can be folded up to the bearing portion fixing zone, then after adjusting the length of the threaded through chest strap parts and closing them on the outer chest strap part. The cut ends of the threaded through chest strap parts are covered by the lining padding portion and the bearing strip portion, preventing the cut ends from irritating the chest or neck of the dog.

20 Claims, 5 Drawing Sheets

(56) References Cited

U.S. PATENT DOCUMENTS

| | | | | |
|---|---|---|---|---|
| 5,184,762 A | * | 2/1993 | Nevitt | A01K 27/002 224/148.6 |
| 5,325,819 A | | 7/1994 | Krauss | |
| 6,101,979 A | * | 8/2000 | Wilson | A01K 1/0272 119/725 |
| D511,596 S | * | 11/2005 | Mugford | D30/152 |
| 9,655,344 B1 | * | 5/2017 | Sebo | A01K 27/002 |
| 2006/0102102 A1 | * | 5/2006 | Bennett | A01K 27/005 119/792 |
| 2007/0266960 A1 | * | 11/2007 | Mugford | A01K 27/002 119/792 |
| 2010/0122667 A1 | * | 5/2010 | Horgan | A01K 27/002 119/792 |
| 2013/0327282 A1 | * | 12/2013 | Sebo | A01K 13/006 119/850 |
| 2014/0202398 A1 | * | 7/2014 | Woodward | A01K 27/002 119/864 |
| 2014/0245970 A1 | * | 9/2014 | Wilson | A01K 27/002 119/864 |
| 2015/0007778 A1 | * | 1/2015 | Yamin | A01K 27/002 119/792 |
| 2016/0183496 A1 | * | 6/2016 | Wilson | A01K 27/003 119/719 |
| 2018/0263219 A1 | * | 9/2018 | Sebo | A01K 27/005 |
| 2019/0082657 A1 | * | 3/2019 | Sebo | A01K 27/002 |
| 2020/0015455 A1 | * | 1/2020 | Xu | A01K 27/002 |

FOREIGN PATENT DOCUMENTS

| | | | | |
|---|---|---|---|---|
| DE | 203 04 940 U1 | | 5/2003 | |
| DE | 3020090609896 | | 4/2010 | |
| DE | 20 2010 016 578 U1 | | 7/2011 | |
| DE | 402011003598-0005 | | 10/2011 | |
| EP | 2910117 A1 | * | 8/2015 | A01K 27/002 |
| GB | 389276 A | | 3/1933 | |
| GB | 2481430 A | * | 12/2011 | A01K 27/002 |
| HU | 3909 U | | 3/2011 | |

OTHER PUBLICATIONS

English language Abstract of DE 202 19 554 U1 (Mar. 20, 2003).
English language Abstract of DE 203 04 940 U1 (May 22, 2003).
English language machine-translation of description and claims of DE 90 17 247.7 U1 (Mar. 14, 1991).

* cited by examiner

A-A section

RELEASABLE CHEST PAD

CROSS-REFERENCE TO RELATED APPLICATIONS

This application is based upon and claims priority under 35 U.S.C. § 119 from Hungarian Patent Application No. P1700385 filed on Sep. 14, 2017, the disclosure of which is incorporated herein in its entirety by reference thereto.

FIELD OF THE INVENTION

The present invention relates to a dog harness, and more particularly to a releasable chest pad comprising a padding portion designed to form a single structural unit with an outer chest strap part and threaded through chest strap parts on the two sides thereof that fit into loop adjuster frames of the dog chest harness, and a lining padding portion coming into contact with the body of a dog fixed only to the outer chest strap part by a bearing portion fixing zone for the adjustability of the threaded through chest strap parts. The lining padding portion can be folded up to the bearing portion fixing zone, and then, after adjusting the length of the threaded through chest strap parts and closing them on the outer chest strap part, the cut ends of the threaded through chest strap parts are covered by the lining padding portion and the bearing strip portion, preventing the cut ends from irritating the chest or neck of the dog.

BACKGROUND OF THE INVENTION

A lot of equipment is needed in the shared everyday life of man and dog, in their shared sports activities, or for the training and deployment of service dogs. Within these activities, the function of dog harnesses is to lead a dog on a leash, hold it back, lift it, assist it in traffic, assist it to pull loads, do sports involving dogs, etc., by means of straps running across the chest, around the neck, under the belly and along the back of a dog and connected to each other. Numerous constructions of harnesses are known where the load is distributed on the neck and chest of the dog, such as in Publications U.S. Pat. No. 5,325,819 and DE 202 19 55401. Other types of dog harnesses try to relieve the neck of the dog, and therefore, the straps run away from it, only across the chest, under the belly and along the back of the dog, such as in Publications DE 20219 554 U1, G 90 17 247.7, and DE 203 04 940 U1.

It can be seen, however, that every dog harness has one or more elements suitable for attaching a leading leash, a chest part or a chest strap connected to a belly strap, a back strap and a trace strap, as well as one or more buckle portions ensuring strap adjustment or fastening on an animal.

Dog harnesses that are especially practical are those where the horizontally running chest strap and the back strap are connected on both sides by a connecting element or neck strap connected to the chest strap and the back strap in a non-releasable manner. Such equipment is disclosed in GB 389,276 (London 1932), and U.S. Pat. No. 5,184,762. A pressure distribution element or chest pad attachable on the chest portion of the dog harness is not mentioned in these utility models.

In prior arrangements, a first pressure distribution element attachable to a dog harness in a releasable manner was the so-called 'Y'-strap, a development in Hungary in 2003. A later, padded version thereof is disclosed in Publication No. 402011003598-0005 (DPMA Design).

For the attachment of this pressure distribution element, the chest strap of the dog harness needs to be fully openable, as the pressure distribution element is attached by pulling on the harness. One example of this type of dog harness is shown in Publication No. DE 3020090609896. The chest strap closes on itself by a hook and loop fastener in a releasable manner. In the previous arrangement, the first chest pad attachable to a dog chest harness in a releasable manner was the so-called 'Y'-strap.

Two loops formed on the stalk of the 'Y'-shaped pressure distributor, fixed to themselves in a non-releasable manner, allow the attachment of the 'Y' pressure distributor to the chest strap by pulling on. After attachment by pulling on the harness, the 'Y' pressure distributor is connected to the chest strap by the loop portions. Both loop portions of the 'Y' pressure distributor are designed to close on themselves at an angle other than 180°. In this manner, the closing edges are not closing on each other. Thereby, the closing edges have an overextending portion or a cut edge.

One previous arrangement also includes a pressure distribution element attachable by partially opening a chest strap, such as the device disclosed in Hungarian utility model No. U1000003. This pressure distribution element, attachable to the chest strap of a dog chest harness, can be attached to any dog harness with a chest strap of an openable design. The loop portion of the pressure distribution element attachable to a dog chest harness according to this utility model is openable, so it can be attached to the chest strap without pulling it on.

Another previous pressure distribution element comprises a padding portion and a strap portion connected to it, with fastener element loop and hook components fixed on the strap portion that divides it into an outer stalk portion and an inner stalk portion towards the padding portion, as well as at least one loop portion connected to the chest strap of the dog harness resting flat between the padding portion and the inner stalk portion.

In this previous arrangement, the padding portion closing element and the inner stalk closing element are connected to each other in a releasable manner, so the loop portion resting flat is openable. According to one aspect of the invention, the padding portion is attached in the connection area of the pressure distribution element attachable to the chest strap of a dog chest harness and the chest strap, in a manner lining it. The padding portion closing element, the inner stalk closing element, the closing element connecting to the outer stalk portion and the outer stalk hook and loop fastener counterpart are connected in that sequence, closing an angle of 180° with each other. According to another aspect of the invention, the padding portion has an edging strip.

A disadvantage of this previous arrangement is that, for attaching the pressure distributor, the pressure distributor itself needs to be equipped with several hook and loop fastener components. The loop portion resting flat extends beyond the chest strap in the vertical direction, and it is complicated to attach. The hook and loop fastener components close on the padding portion on top of each other, which, in addition to making the attachment cumbersome, subjects the surface of the padding portion to stress. This previous arrangement discloses a padding portion removable from the chest strap, from the outer chest strap part, which is disadvantageous because of the hook and loop fastener adjustments, and also involves the risk of improper adjustment.

SUMMARY OF THE INVENTION

An aim of the present invention is to make the chest strap of a dog harness, the outer chest strap part thereof crossing the chest bone, removable from the dog harness, and to combine it in a displacement-free manner with a padding portion which, together with a bearing strip portion, at least partially lines the outer chest strap part and the threaded through chest strap parts led through the loop adjuster frames of the dog harness on the side towards the chest of the dog. Another aim of the present invention is to exclude the possibility of improper attachment of the chest pad by fixing it to the outer chest strap part in a fixed manner, and by including an information field on the outer cover, covered by the outer chest strap part.

The present invention is based on the recognition that it is disadvantageous to have hook and loop fastener components or other straps on or running across the padding portion, covering it partially, coming into contact with and/or moving across the edging element at one or more points, irritating its surface when it is attached to the outer chest strap part. It is preferred to secure the padding portion to the outer chest strap part, and also to maintain the adjustability of the chest strap. It is further preferred to ensure the replaceability of at least a part of the chest strap, and the outer chest strap part, as they are subjected to increased stress.

The present invention is achieved by dividing the chest strap into three parts. First, there is an outer chest strap part on the outward side in the direction of movement on which there is a hook and loop fastener loop component on the side towards the chest of the dog. Next, there are threaded through chest strap parts at both ends of the outer chest strap part, in the continuation thereof, on which hook and loop fastener hook components are fixed. The threaded through chest strap parts are folded back in the direction of the axis line on both sides of the dog chest harness. Loop adjuster frames separate the releasable chest pad from loop adjuster holding chest strap parts. The cut ends of the threaded through chest strap parts close optimally on the axis line. An information field is included on the outer cover folded on the threaded through chest strap parts. The information field is not visible during proper use and operation, and contains information that makes clear the direction of folding of the chest pad and the proper adjustment of the threaded through chest strap parts.

Thus, the present invention relates to a releasable chest pad for a dog harness comprising a padding portion having a foam element covered at least partially by an outer cover connected to an outer chest strap part that fits into loop adjuster frames fixed to loop adjuster holding chest strap parts of the dog chest harness that, during normal operation, is adjusted to line the chest of the dog, extend in the direction of the belly strap and continue in an adjustable length belly element, and on the side opposite to the belly element, have a bearing strip portion connecting it to the outer chest strap part of the dog chest harness.

Features of the invention are that the releasable chest pad comprises an outer chest strap part that is removable from the dog chest harness, extending beyond the padding portion in the direction perpendicular to the axis line, on both sides of the axis line, fixed on the padding portion in a fixed manner in a bearing portion fixing zone of a bearing strip portion and continuing in a threaded through the chest strap part ending in a cut end on both sides of the axis line which can be threaded through the loop adjuster frames fixed in the loop adjuster holding chest strap parts of the dog chest harness, and closed on the outer chest strap part on the side towards the inner lining of the padding portion by connecting the hook and loop fastener hook component and the hook and loop fastener loop component. Furthermore, the bearing strip portion of the padding portion is folded on an outer chest strap part upper edge portion, extending on both sides of the axis line, and continues in the bearing portion fixing zone crossing the axis line, fixing it in a displacement-free manner, and in the direction opposite to the bearing portion fixing zone the bearing strip portion continues in a lining padding portion. The cut ends of the threaded through chest strap parts can be folded between the outer chest strap part and the lining padding portion, to be connected between the outer chest strap part upper edge portion and an outer chest strap part lower edge portion, so the cut ends are at least partially covered by the bearing strip portion from the direction of the outer chest strap part upper edge portion. The lining padding portion and the bearing strip portion can be folded up to the line of the bearing portion fixing zone in the direction of the outer chest strap part upper edge portion to allow the unhindered opening and the length adjustment of the threaded through chest strap parts on both sides of the axis line.

According to an aspect of the invention, the bearing portion fixing zone is sewn, fixing the outer cover on the outer chest strap part, which is perpendicular to the axis line. In one embodiment, the bearing strip portion is formed from an extension of the outer cover, in continuation thereof. The thickness of the bearing strip portion measured perpendicularly to the outer cover is less than that of the lining padding portion. The bearing portion fixing zone is covered by a fixing zone covering element. The fixing zone covering element is a hook and loop fastener.

The bearing portion fixing zone of the releasable chest pad is sewn, fixing the outer cover on the outer chest strap part.

In another embodiment of the releasable chest pad, the bearing strip portion is formed from an extension of the outer cover, in the continuation thereof.

The thickness of the bearing strip portion of the releasable chest pad measured perpendicularly to the outer cover is less than that of the lining padding portion.

The bearing portion fixing zone of the releasable chest pad is covered by a fixing zone covering element.

An information field is included on the outer cover of the padding portion of the releasable chest pad, covered at least partially by the outer chest strap part.

BRIEF DESCRIPTION OF THE DRAWINGS

The present invention is further described below with reference to the following figures, in which.

DETAILED DESCRIPTION OF THE INVENTION

Figure 1:
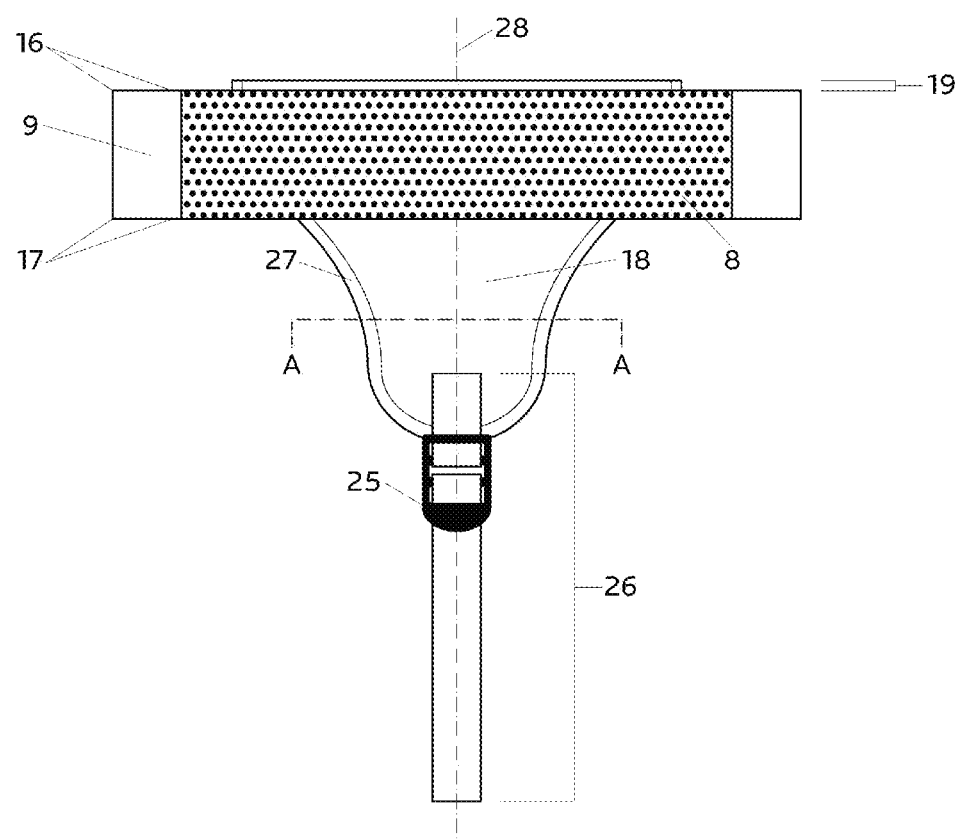
FIG. 1 shows a front view of the releasable chest pad and the main parts thereof from the direction of the fixing zone covering element.
Figure 2:
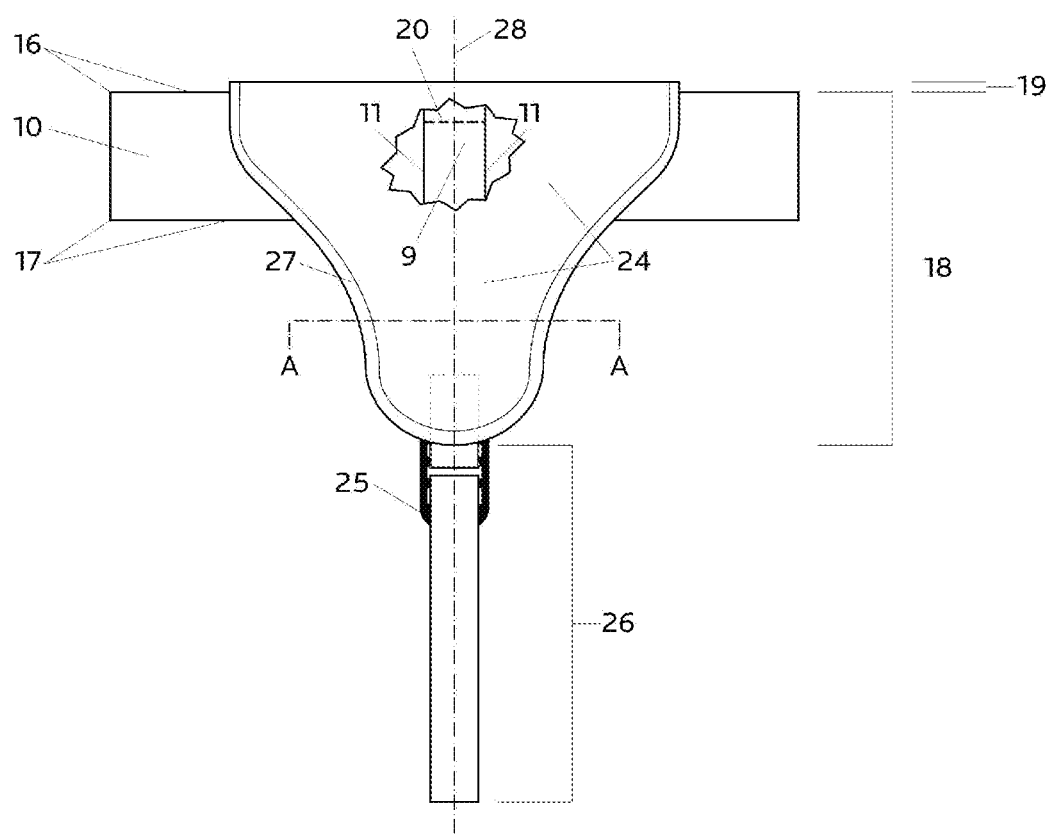
FIG. 2 shows the releasable chest pad from the direction of the chest of a dog, depicting a full view of the lining padding portion and showing in a local cross section the cut ends of the threaded through chest strap parts covered by the lining padding portion.
Figure 5:
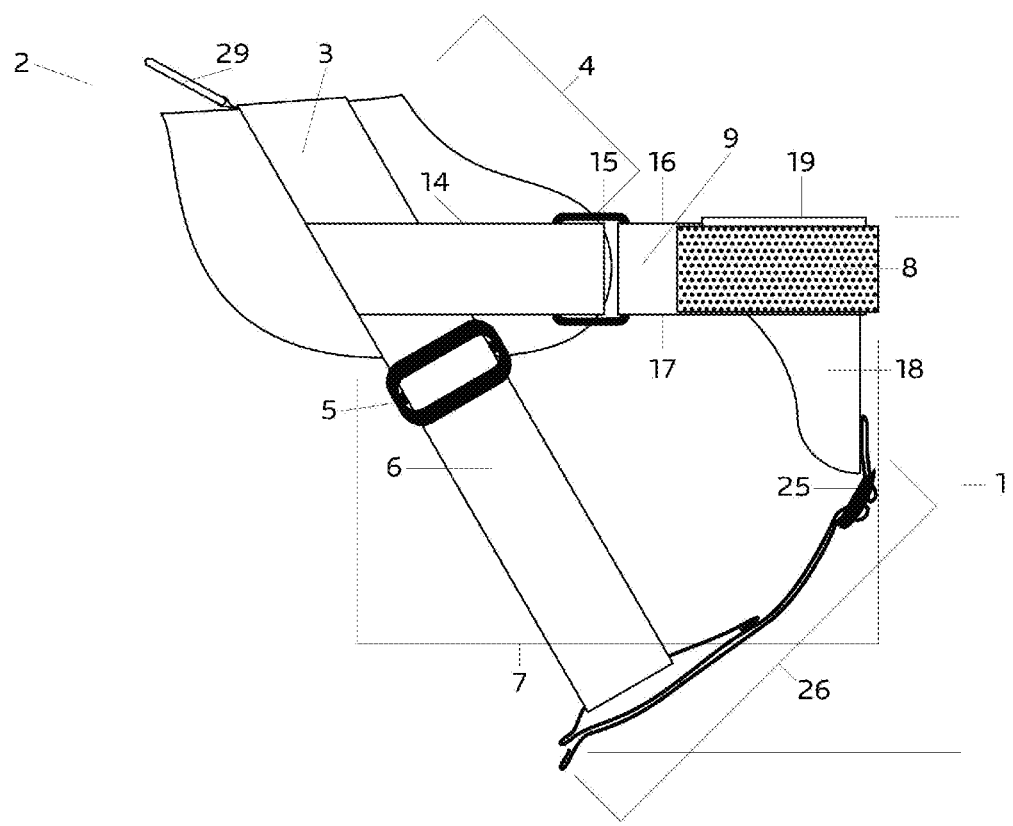
FIG. 5 shows the releasable chest pad attached to a dog chest harness, in a state ready for normal operation.

FIGS. 1 and 2 show the releasable chest pad 1 in a state removed from the dog chest harness 2 shown in FIG. 5. It is clearly shown in both figures that, in a preferred embodiment, the releasable chest pad 1 is arranged symmetrically on both sides of the axis line 28, and the outer chest strap part 9 extends beyond the padding portion 21 on both sides of the axis line 28. The padding portion 21 itself extends on both sides of the axis line 28, narrowing along the axis line 28 in the direction opposite to the outer strap part 9, and ends in a strap-shaped belly element 26. The length of the belly element 26 is adjustable by a slide adjuster 25.

FIGS. 1 and 2 show that the outer chest strap part 9 has an outer chest strap part upper edge portion 16 perpendicular to the axis line 28 on the side opposite to the belly element 26, preferably forming one of the edges of the strap-shaped outer chest strap part 9. The outer chest strap part 9 has an outer chest strap part lower edge portion 17 on the side of the outer chest strap part 9 towards the belly element 26, extending along the whole length of the outer chest strap part 9 in parallel to the outer chest strap part upper edge portion 16. FIGS. 1 and 2 show that the lining padding portion 18 is bordered by an edging element 27, and narrows in the direction of the belly element 26.

FIG. 1 shows a front view of the releasable chest pad 1 from the side opposite to the chest of a dog, towards the outer chest strap part 9. The padding portion 21 of the releasable chest pad 1 comprises a lining padding portion 18 extending in the direction of the belly element 26, a bearing strip portion 19 extending over the outer chest strap part upper edge 16, and a bearing portion fixing zone 20 on the side of the outer chest strap part 9 towards a fixing zone covering element 8. The bearing portion fixing zone 20 is sewing, extending along the outer chest strap part 9 on both sides of the axis line 28, and fixes together the padding portion 21 and the outer chest strap part 9 in a displacement-free manner. The bearing portion fixing zone 20 is covered by a fixing zone covering element 8, which may be a hook and loop fastener.

FIG. 2 shows in a local cross section the bearing portion fixing zone 20 not shown in FIG. 1, as it is covered by the fixing zone covering element 8. The outer chest strap part 9 extends in a continuous manner to the axis line 28 along the whole width of the padding portion 21, fixed to it and extending beyond it on both sides of the axis line 28.

FIG. 2 shows a full view of the lining padding portion 18 from the direction of the chest of a dog that is threaded through chest strap parts 10, shown partially covered by the outer chest strap part 9 in FIG. 1. FIG. 2 shows in a local cross section that the outer chest strap part 9 and the lining padding portion 18 enclose a given section of the threaded through chest strap parts 10 and the cut ends 11. Most preferably, the cut ends 11 are adjusted to be symmetrical on both sides of the axis line 28. The local cross section also shows the bearing portion fixing zone 20, and that the cut ends 11 and the threaded through chest strap parts 10 do not come into contact with it, as they are not fixed by it to the outer chest strap part 9. If on a given side of the axis line 28, the cut end 11 of the threaded through chest strap part 10 is adjusted to be further away from the axis line 28 in the direction of the edging element 27, the length of the outer chest strap part 9 shown in FIGS. 1, 2 and 3 increases with the extent of the adjustment, while the length of the threaded through chest strap part 10 decreases accordingly.

Figure 3:
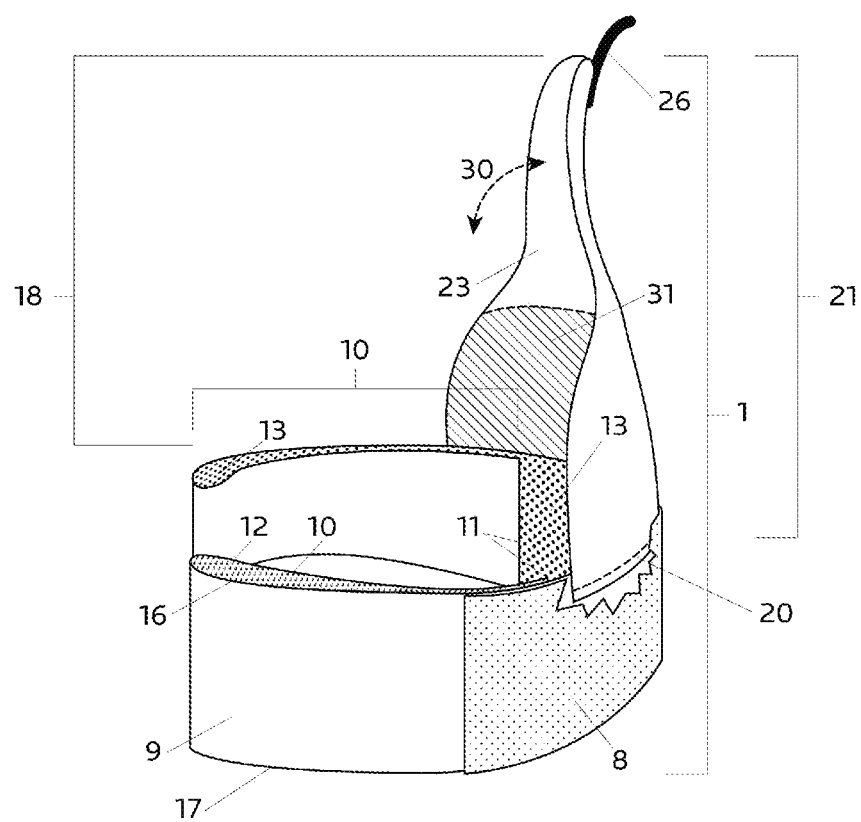
FIG. 3 shows in a side view in which, for closing the threaded through chest strap parts on the outer chest strap part, the lining padding portion can be folded up to the bearing portion fixing zone at most.

FIG. 3 shows a side view of the releasable chest pad 1 of FIG. 2, showing the threaded through chest strap parts 10 formed in a continuous manner, and their cut ends 11. The outer chest strap part 9 extends along the whole width of the padding portion 21, the outer chest strap part upper edging portion 16 and the fixing zone covering element 8. For closing the threaded through chest strap parts 10 on the outer chest strap part 9, the lining padding portion 18 can be folded up to the bearing portion fixing zone 20 at most. An information field 31 is included on the outer cover 23, which provides information on the adjustment of the threaded through chest strap parts 10. During normal operation, when the releasable chest pad 1 is on a dog, the information field 31 is covered by the outer chest strap part 9. Preferably, the information field 31 is applied to the lining padding portion 18 of the padding portion 21 by screen printing. The direction of folding up or down 30 shows that the lining padding portion 18 can be folded down in the direction of the threaded through chest strap parts 10, or can be folded up to the bearing portion fixing zone 20 at most. The threaded through chest strap parts 10 have a hook and loop fastener hook component 12 on the side towards the outer chest strap part 9, to be connected to the hook and loop fastener loop component 13 of the outer chest strap part 9 between the outer chest strap part upper edging portion 16 and the outer chest strap part lower edging portion 17. A local cross section shows that the outer cover 23 is fixed on the outer chest strap part 9 by the bearing portion fixing zone 20, which is preferably sewing, covered at least partially by the fixing zone covering element 8. The fixing zone covering element 8 can also be fixed on the outer chest strap part 9 by the bearing portion fixing zone 20. The outer chest strap part 9 ends in a threaded through chest strap part 10 formed in the continuation thereof on both sides.

Figure 4:
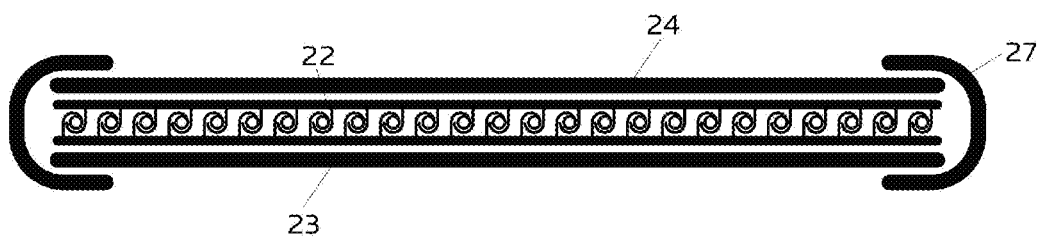
FIG. 4 shows the A-A cross section in FIG. 2 of the outer cover, the inner lining, and the foam element enclosed by them.

FIG. 4 shows the A-A cross section of the releasable chest pad 1 of FIG. 2, comprising an outer cover 23, an inner lining 24 and a foam element 22 enclosed by them, and bordered by an edging element 27. The outer cover is a water repellent or waterproof nylon fabric. The foam element 22 is a closed cell foam material or a thick textile fabric, which lines the chest of a dog.

FIG. 5 shows the releasable chest pad 1 attached to a dog chest harness 2, in a state ready for normal operation. The dog chest harness 2 has a belly strap 6, a back strap 3 equipped with a leash ring 29, and a connecting element 4 ending therein. A chest strap 7, forming a triangle with the back strap 3 and the connecting element 4, is divided by loop adjuster frames 15 into an outer chest strap part 9 and loop adjuster holding chest strap parts 14. The padding portion 21 has a bearing strip portion 19 folded on the outer chest strap part 9, its end opposite to the bearing strip portion 19 continuing in a belly element 26 in the direction of the belly strap 6, and the belly element 26 is connected thereto by looping around it. The length of the belly element 26 is adjustable by a slide adjuster 25. A fixing zone covering element 8 is formed on the outer chest strap part 9, extending in the direction of the loop adjuster frames 15, and is preferably a hook and loop fastener.

This releasable chest pad lines the chest of a dog. The bearing strip portion and the lining padding portion can be folded up to the bearing portion fixing zone with one move, and then the threaded through chest strap parts become accessible to allow easier adjustment or full opening. The outer chest strap part, the threaded through chest strap parts and the padding portion of the releasable chest pad form a single structural unit, to allow its replacement and release from the dog harness. The improper adjustment of the lining padding portion or the cut ends can be excluded by the data content of the information field included optimally on the surface of the padding portion covered by the outer chest strap part.

LIST OF REFERENCE NUMBERS 1) releasable chest pad
2) dog chest harness 3) back strap
4) connecting element
5) buckle portion
6) belly strap
7) chest strap
8) fixing zone covering element
9) outer chest strap part
10) threaded through chest strap part
11) cut end
12) hook and loop fastener hook component
13) hook and loop fastener loop component
14) loop adjuster holding chest strap part
15) loop adjuster frame
16) outer chest strap part upper edge portion
17) outer chest strap part lower edge portion
18) lining padding portion
19) bearing strip portion
20) bearing portion fixing zone
21) padding portion
22) foam element
23) outer cover
24) inner lining
25) slide adjuster
26) belly element
27) edging element
28) axis line
29) leash ring
30) direction of folding up or down
31) information field

The invention claimed is:

1. A dog chest harness, comprising:
a releasable chest pad having a padding portion having a foam element covered at least partially by an outer cover and an inner cover, the padding portion being connected to an outer chest strap part that fits into loop adjuster frames fixed to loop adjuster holding chest strap parts, wherein, during normal operation, the outer chest strap part extends in the direction of a belly strap and continues in an adjustable length belly element connected to the belly strap in a releasable manner;
a bearing strip portion connecting it to the outer chest strap part of the dog chest harness, wherein the releasable chest pad is removable from the dog chest harness, and it has an outer chest strap part crossing the axis line, extending beyond the padding portion on both sides of the axis line, fixed together with the padding portion in a bearing portion fixing zone formed in the continuation of the bearing strip portion;
the outer chest strap part continues in a threaded through chest strap part ending in a cut end on both sides of the axis line, which is configured to be threaded through the loop adjuster frames fixed in the loop adjuster holding chest strap parts of the dog chest harness, and close on the outer chest strap part on the side towards the inner lining of the padding portion by connecting a first hook and loop fastener hook component and a second hook and loop fastener loop component;
the bearing strip portion of the padding portion being folded on an outer chest strap part upper edge portion, covering it, extending on both sides of the axis line, and continuing in the bearing portion fixing zone crossing the axis line, and fixing it on the outer chest strap part in a displacement-free manner;
in the direction opposite to the bearing portion fixing zone, the bearing strip portion continuing in a lining padding portion; and
cut ends of the threaded through chest strap parts being configured to be folded between the outer chest strap part and the lining padding portion, to be connected between the outer chest strap part upper edge portion and an outer chest strap part lower edge portion, whereby the cut ends are at least partially covered by the bearing strip portion from the direction of the outer chest strap part upper edge portion, and in normal use the lining padding portion and the bearing strip portion being foldable up to the line of the bearing portion fixing zone in the direction of the outer chest strap part upper edge portion to allow the unhindered opening and the length adjustment of the threaded through chest strap parts on both sides of the axis line.

2. The dog chest harness according to claim 1, wherein the bearing portion fixing zone is sewn, fixing the outer cover on the outer chest strap part.

3. The dog chest harness according to claim 2, wherein the bearing portion fixing zone is perpendicular to the axis line.

4. The dog chest harness according to claim 3, wherein the bearing strip portion is formed from an extension of the outer cover, in the continuation thereof.

5. The dog chest harness according to claim 4, wherein the thickness of the bearing strip portion measured perpendicularly to the outer cover is less than that of the lining padding portion.

6. The dog chest harness according to claim 3, wherein the thickness of the bearing strip portion measured perpendicularly to the outer cover is less than that of the lining padding portion.

7. The dog chest harness according to claim 2, wherein the bearing strip portion is formed from an extension of the outer cover, in the continuation thereof.

8. The dog chest harness according to claim 7, wherein the thickness of the bearing strip portion measured perpendicularly to the outer cover is less than that of the lining padding portion.

9. The dog chest harness according to claim 2, wherein the thickness of the bearing strip portion measured perpendicularly to the outer cover is less than that of the lining padding portion.

10. The dog chest harness according to claim 2, wherein the bearing portion fixing zone is covered by a fixing zone covering element.

11. The dog chest harness according to claim 1, wherein the bearing portion fixing zone is perpendicular to the axis line.

12. The dog chest harness according to claim 11, wherein the bearing strip portion is formed from an extension of the outer cover, in the continuation thereof.

13. The dog chest harness according to claim 12, wherein the thickness of the bearing strip portion measured perpendicularly to the outer cover is less than that of the lining padding portion.

14. The dog chest harness according to claim 11, wherein the thickness of the bearing strip portion measured perpendicularly to the outer cover is less than that of the lining padding portion.

15. The dog chest harness according to claim 1, wherein the bearing strip portion is formed from an extension of the outer cover, in continuation thereof.

16. The dog chest harness according to claim 15, wherein the thickness of the bearing strip portion measured perpendicularly to the outer cover is less than that of the lining padding portion.

17. The dog chest harness according to claim 1, wherein the thickness of the bearing strip portion measured perpendicularly to the outer cover is less than that of the lining padding portion.

18. The dog chest harness according to claim 1, wherein the bearing portion fixing zone is covered by a fixing zone covering element.

19. The dog chest harness according to claim 18, wherein the fixing zone covering element is a hook and loop fastener.

20. The dog chest harness according to claim 1, wherein an information field is included on the outer cover of the padding portion, covered at least partially by the outer chest strap part.

\* \* \* \* \*